United States Patent
Puckett

[11] Patent Number: 5,940,270
[45] Date of Patent: Aug. 17, 1999

[54] TWO-PHASE CONSTANT-PRESSURE CLOSED-LOOP WATER COOLING SYSTEM FOR A HEAT PRODUCING DEVICE

[76] Inventor: John Christopher Puckett, 23535 Frederick Rd., Clarksburg, Md. 20871

[21] Appl. No.: 09/111,747
[22] Filed: Jul. 8, 1998
[51] Int. Cl.[6] .................................................. H05K 7/20
[52] U.S. Cl. .................. 361/699; 361/698; 361/700; 361/701; 361/704; 361/717; 361/718; 361/719; 257/714; 257/715; 174/15.1; 165/80.4; 165/104.33; 62/259.2
[58] Field of Search ..................................... 361/689, 698, 361/699, 700, 701, 703; 257/714, 715; 174/15.1, 15.2; 165/80.4, 104.33

[56] References Cited

U.S. PATENT DOCUMENTS

| | | |
|---|---|---|
| 3,609,991 | 10/1971 | Chu et al. . |
| 4,393,663 | 7/1983 | Grunes et al. ............................ 62/119 |
| 4,546,619 | 10/1985 | Rohner ................................... 165/80.4 |
| 5,168,919 | 12/1992 | Berenholz et al. ...................... 165/80.4 |
| 5,356,749 | 10/1994 | Porter . |
| 5,383,340 | 1/1995 | Larson et al. . |
| 5,394,936 | 3/1995 | Budelman ................................ 361/700 |
| 5,396,775 | 3/1995 | Rockenfeller et al. . |
| 5,411,077 | 5/1995 | Tousignant ......................... 165/104.33 |
| 5,427,174 | 6/1995 | Lomolino, Sr. et al. .......... 165/104.13 |
| 5,430,609 | 7/1995 | Kikinis . |
| 5,529,115 | 6/1996 | Paterson ................................. 165/80.4 |
| 5,587,880 | 12/1996 | Phillips et al. . |
| 5,634,351 | 6/1997 | Larson et al. . |
| 5,704,416 | 1/1998 | Larson et al. ........................... 361/700 |
| 5,761,037 | 6/1998 | Anderson et al. ...................... 361/700 |

FOREIGN PATENT DOCUMENTS

| | | |
|---|---|---|
| 3244654 | 7/1983 | Germany . |
| 2199650 | 7/1988 | United Kingdom . |
| 2204113 | 11/1988 | United Kingdom . |

Primary Examiner—Leo P. Picard
Assistant Examiner—Boris L. Chervinsky
Attorney, Agent, or Firm—Stephen Christopher Swift

[57] ABSTRACT

A cooling device for a machine, especially, but not limited to, a device for cooling the central processing unit (CPU) of a desktop computer, thereby increasing the speed at which it can operate. In the preferred embodiment, the cooling device includes a copper evaporation chamber and a conduit made of copper pipe having a condensation coil, which are connected in a single closed loop, and contain water. As heat is absorbed by the evaporation chamber from the CPU or other heat generating component, the water changes from liquid to gas, and gravity and pressure differences cause the water to circulate through the conduit. As heat is transferred from the conduit to its surroundings, the water changes from gas to liquid, and returns to the evaporation chamber. The high heat of vaporization and condensation of water allows heat to be efficiently transferred with a small difference in temperature between its liquid and gaseous states. The boiling point of the water is reduced by a partial vacuum inside the evaporation chamber and conduit, to reduce the temperature to which the CPU or other component can be efficiently cooled by the invention. Alternatively, other fluid having a high heat of vaporization and condensation may be substituted for water, and the other materials that are good conductors of heat may be substituted for copper in the evaporation chamber and conduit. The invention may be installed during manufacture, or it may be sold separately and installed later.

14 Claims, 4 Drawing Sheets

TWO-PHASE CONSTANT-PRESSURE CLOSED-LOOP WATER COOLING SYSTEM FOR A HEAT PRODUCING DEVICE

BACKGROUND OF THE INVENTION

1. Field of the Invention

The present invention relates to cooling devices for machines, especially, but not limited to, cooling devices for the central processing unit of a desktop computer.

2. Description of the Prior Art

Heat produced as a byproduct of useful work limits the rate at which machinery can operate without melting or burning. In particular, heat limits the rate at which electronic devices, such as the central processing units of computers, can operate. The present invention uses the phase change of fluids from liquid to gas and visa versa (especially, but not limited to, water) to create a device that, without the use of movable parts, carries heat away from the machinery, to increase the rate at which it can operate.

U.S. Pat. No. 3,609,991, issued to Richard C. Chu and Un-Pah Hwang, on Oct. 5, 1971, discloses a cooling system for electronic components having thermally induced circulation. A low boiling point liquid contained in hoses (or other conduits) absorbs heat from the electronic components, causing vapor bubbles to form in the liquid by nucleate boiling. The heated, partially vaporized fluid passes into a reservoir with a cooling means, where it is cooled and condensed, and then recirculates from the reservoir back through other hoses to absorb more heat from the electronic components. The instant invention is distinguishable, in that it discloses the use of water (or other fluid) in a partial vacuum to lower its boiling point, which is contained entirely within copper pipes (or other conduits) in a closed loop, and does not require the use of special cooling means.

U.S. Pat. No. 4,393,663, issued on Jul. 19, 1983, to Howard E. Grunes and Dennis J. Morrison, discloses an apparatus for transferring heat from a heat source to a heat sink, using a vaporizable liquid which is heated in an evaporator, so that some of the liquid vaporizes to propel the remaining heated liquid to a condenser, where it is cooled and returned to the evaporator, with a "restriction" or check valve in the return path to the evaporator, to insure that the liquid flows only one way. The instant invention is distinguishable, in that only vapor leaves its evaporation chamber, and its conduit is so disposed that a check valve is unnecessary to insure flow in only one direction.

U.S. Pat. No. 4,546,619, issued on Oct. 15, 1985, to Thomas G. Rohner, discloses a mechanical cooler for electronics, containing a fluid that is made to circulate by a compressor. The instant invention is distinguishable, in that it does not require a compressor.

U.S. Pat. No. 5,168,919, issued on Dec. 8, 1992, to Jack Berenholtz and John K. Bowman, discloses an air cooled heat exchanger for multi-chip assemblies, having a self-contained evaporator and condenser, requiring no external power source. The instant invention is distinguishable, in that it has a single evaporation chamber in direct contact with the heat source, connected at its top to a single conduit into which vapor enters, condenses, and returns via a connection at the bottom of the evaporation chamber, so that the separation of liquid and gas phases in the chamber due to gravity causes the fluid to flow in one direction only through the conduit, with the conduit and the chamber forming a single closed loop.

U.S. Pat. No. 5,365,749, issued to Warren W. Porter, on Nov. 22, 1994, discloses a computer component cooling system, with local evaporation of pressurized refrigerant within an expansion chamber as it absorbs heat from the component. The instant invention is distinguishable, in that it does not require the use of an expansion chamber with movable parts to cool the circulating fluid, nor the use of a compressor to pressurize the fluid.

U.S. Pat. No. 5,383,340, issued to Ralph I. Larson, Richard L. Phillips and Alan F. Beane, on Jan. 24, 1995, discloses a two-phase cooling system for laptop computers. A fluid contained in a closed loop circulates between an evaporator located in the base of the laptop, where the fluid changes from liquid to gas as it absorbs heat from the computer, and a condenser located in the lid of the laptop, where the fluid changes from gas to liquid as it loses heat. The instant invention is distinguishable, in that it is designed for desktop computers, rather than laptop computers, and no part of it is required to be located in a lid. Also, in its preferred embodiment, the instant invention discloses the use of water as the circulating fluid, and the use of copper pipe of uniform diameter in a condensation coil.

U.S. Pat. No. 5,394,936, issued on Mar. 7, 1995, to Gerald A. Budelman, discloses a heat removal system for electric devices, in which a fluid vaporizes in a primary heat sink which is bonded directly to a heat producing electric device, then flows through a flexible tubing to a secondary heat sink, where the tubing is cooled by airflow and the fluid condenses and passes through a first check valve into a flexible bladder, then through a second check valve back through the flexible tubing to the primary heat sink. The instant invention is distinguishable, in that it has no flexible bladder or check valves, but insures that fluid flows in one direction through the orientation of its evaporation chamber and the manner in which it is connected to the conduit through which the fluid flows.

U.S. Pat. No. 5,396,775, issued to Uwe Rockenfeller and Lance D. Kirol, on Mar. 14, 1995, discloses a cooling apparatus for electronic and computer components, without the use of compressors or pumps. Heat is absorbed from the components by a complex compound of metal salts and polar refrigerants, which circulates between two reactors in which it alternately undergoes endothermic and exothermic reactions. The instant invention is distinguishable, in that it does not require the use of reactors containing metal salts and polar refrigerants.

U.S. Pat. No. 5,411,077, issued on May 2, 1995, to Lew A. Tousignant, discloses a flexible thermal transfer apparatus for cooling electronic components, with a fluid container that expands as the fluid absorbs heat and changes from liquid to gas. The vapor condenses at a location remote from the heat source, and trickles back down into the container by the same route that it left the container. The instant invention is distinguishable, in that it has a rigid, non-expandable evaporation chamber, and the fluid flows in one direction only through a closed loop.

U.S. Pat. No. 5,427,174, issued on Jun. 27, 1995, to Paul A. Lomolino, Sr. et al., discloses a method and apparatus for a self contained heat exchanger for cooling a solid state electronic device, using a mixture of two or more coolants within one or more hermetically sealed chambers, within which the coolant circulates. The coolants should have different boiling points, so that the lower boiling point fluid agitates that higher boiling point fluid, causing it to circulate within the chamber, so that heat is transferred. The instant invention is distinguishable, in that it does not require more than one fluid as a coolant, and the coolant circulates through a tubular conduit that is separate from its evaporation chamber.

U.S. Pat. No. 5,430,609, issued to Dan Kikinis, on Jul. 4, 1995, discloses a method of cooling a microprocessor in a portable computer, using a layer of compressible, heat-conducting material. The instant invention is distinguishable, in that it uses a circulating fluid, rather than a heat sink plate.

U.S. Pat. No. 5,529,115, issued on Jun. 25, 1996, to Robert W. Paterson, discloses a cooling device for an integrated circuit device, including a chamber that is partially filled with a coolant which forms a pool in the chamber. Heat generated by the integrated circuit device causes boiling of the coolant in the pool, so that vaporized coolant rises and condenses on a ceiling of the chamber, and then drops back down into the pool. Vapor and drops of condensed coolant travel through conduits in the chamber, but do not leave the chamber, and vapor and condensed coolant travel in opposite directions through the same conduits. The instant invention is distinguishable, in that in it the fluid flows in only one direction through a conduit that is external to the evaporation chamber.

U.S. Pat. No. 5,587,880, issued to Richard J. Phillips and Ralph I. Larson, on Dec. 24, 1996, discloses a computer cooling system operable under the force of gravity in a first orientation, and against the force of gravity in a second orientation. Fluid circulates between an evaporator in which heat is absorbed, and a condenser in which heat is dissipated. A check valve ensures that: the fluid flows in only one direction. The instant invention is distinguishable, in that it does not include a check valve, and operates in only one orientation. Also, in its preferred embodiment, the instant invention discloses the use of water as the circulating fluid, and the use of copper pipe of uniform diameter in a condensation coil.

U.S. Pat. No. 5,634,351, issued to Ralph I. Larson, Richard J. Philips and Alan F. Beane, on Jun. 3, 1997, discloses a two-phase cooling system for a laptop computer, which differs from the above-mentioned U.S. Pat. No. 5,383,340 in that the evaporator and the condenser are both included in either the lid or the base of the computer. The instant invention is distinguishable, in that it is designed for desktop computers, rather than for laptop computers, and is not required to have a lid housing a screen and a base housing a keyboard. As mentioned before, in its preferred embodiment, the instant invention discloses the use of water as the circulating fluid, and the use of copper pipe of uniform diameter in a condensation coil.

U.S. Pat. No. 5,704,416, issued on Jan. 6, 1998, to Ralph I. Larson and Richard L. Phillips, discloses a two-phase component cooler, having a container that has at least one wall with sufficient flexibility that the wall expands as the coolant vapor expands. The instant invention is distinguishable, in that in it the evaporation chamber and the conduit do not expand as liquid in them is vaporized.

U.S. Pat. No. 5,761,037, issued on Jun. 2, 1998, to Timothy Merrill Anderson et al., discloses an orientation independent evaporator, including a wicking member possessing a number of surface accessible channels. Because of the wicking member, the evaporator is able to be operated in any orientation with respect to a gravitational field. The instant invention is distinguishable, in that in it does not have a wicking member, and can only operate within a range of orientations with respect to a gravitational field, as it makes use of gravity to cause the fluid to move in one direction only.

British Patent No. 2,199,650, issued to the Sundstrand Corporation, application published on Jul. 13, 1988, discloses a means for cooling electronic components, with a fluid that circulates without the use of moving parts through capillary channels, between an evaporator in which it absorbs heat and changes from liquid to gas, and a condenser in which it dissipates heat and changes from gas to liquid. The invention is distinguishable, in that it uses copper pipes or similar conduits, rather than capillary channels.

British Patent No. 2,204,113, issued to Marconi Electronic Devices Limited, application published on Nov. 2, 1988, discloses a phase change cooling arrangement for components such as semiconductors, with a chamber containing liquid which is partially vaporized when it absorbs heat, and means for monitoring the temperature difference between the evaporating chamber and the condenser. The instant invention is distinguishable, in that in it the fluid circulates in a single closed loop.

German Patent No. 3,244,654, issued to Gbsta Lundqvist, on Jul. 9, 1983, discloses a cooling unit for electronic equipment, in which heat is absorbed from operating components by heat exchangers and carried off by a refrigerating fluid that passes through multiple tubes. The invention is distinguishable, in that it uses water or other fluid that undergoes phase changes while circulating within a single closed tubular loop.

None of the above inventions and patents, taken either singly or in combination, is seen to describe the instant invention as claimed.

SUMMARY OF THE INVENTION

The present invention is a cooling device for machines, especially, but not limited to, the central processing unit of a desktop computer. Heat is absorbed by an evaporation chamber, causing water or other fluid in the evaporation chamber to boil. The vapor passes through a conduit including a condensation coil, where heat is transferred to the environment, and the fluid condenses and returns to the evaporation chamber.

Accordingly, it is a principal object of the invention to provide an efficient and economical cooling device for the central processing unit of a desktop computer.

It is another object of the invention to provide a cooling device for any heat generating component of any machine.

It is a further object of the invention to provide a cooling device that can be installed during manufacture.

Still another object of the invention is to provide a cooling device that can be sold separately and installed after manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a cooling device for machines. The preferred embodiment is designed to cool the central processing unit (CPU) of a desktop computer, but the invention may be used to cool other heat generating components of computers or other machines. A desktop computer is distinguished from a laptop computer, in that it is suitably dimensioned and configured for placement on a desk or table, is generally larger than a laptop computer, is usually too heavy to carry easily by hand, does not have a lid and a base that are pivotally attached, and the monitor and keyboard are usually not permanently attached to the main body of the computer.

Figure 1:
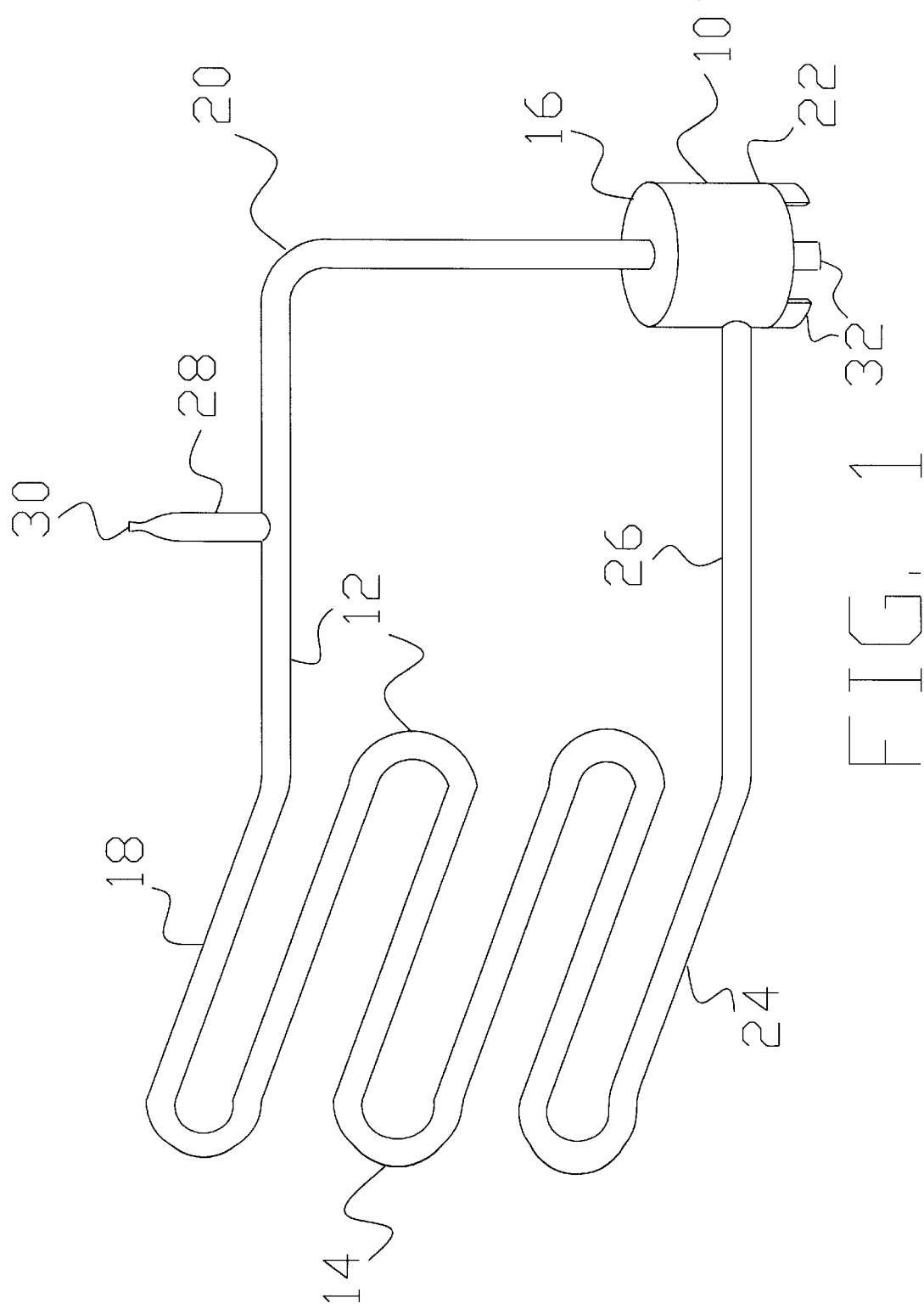
FIG. 1 is a perspective view of the invention.

FIG. 1 is a perspective view of the invention, showing the evaporation chamber 10 and the conduit 12. The conduit forms a condensation coil 14. The top 16 of the evaporation chamber is connected to the top 18 of the condensation coil by the outgoing portion 20 of the conduit. The bottom 22 of the evaporation chamber is connected to the bottom 24 of the condensation coil by the incoming portion 26 of the conduit. Water or other fluid is poured into the interior of the conduit and evaporation chamber through the inlet 28. Air is then pumped out through the inlet, creating a partial vacuum that reduces the boiling point of the fluid. The end 30 of the inlet is then crimped and soldered shut, so that the interior is hermetically sealed. Prongs 32 detachably retain the evaporation chamber on the heat generating component. Alternatively, the evaporation chamber may be permanently retained on the heat generating component by epoxy glue or other means. However, it is not essential that the heat generating component and the evaporation chamber be in physical contact, so long as they are in thermal contact; a substance that is a good conductor of heat may be placed between them.

Heat from the CPU or other component causes the fluid in the evaporation chamber to change from liquid to vapor. Gravity causes the vapor to rise to the top of the evaporation chamber, where it passes out through the outgoing portion of the conduit into the top of the condensation coil. As the vapor passes through the condensation coil, heat is transferred from the interior of the conduit to its surroundings (by radiation, conduction and/or convection), causing the vapor to cool and condense back to a liquid state. The liquid flows back from the bottom of the condensation coil through the incoming portion of the conduit into the bottom of the evaporation chamber, and the cycle is continuously repeated as long as heat is generated by the CPU or other component. The circulation of the fluid within the conduit is caused entirely by the separation due to gravity of the liquid and gaseous states in the evaporation chamber, and the pressure differential between areas of the conduit and evaporation chamber where the fluid is in different states; no moving parts are required. Preferably, the evaporation chamber is made of copper, and the conduit is formed from copper pipe, but they can also be formed from other metallic or nonmetallic substances that are good conductors of heat. Preferably, all portions of the conduit should have the same internal diameter or cross-sectional area, to avoid restrictions to the fluid's circulation that will cause pressure increases that increase the boiling point.

The absence of moving parts makes it possible for the present invention to take advantage of the high heat of vaporization and condensation of water, that is the result of hydrogen bonds between water molecules in the liquid state that are broken during vaporization and reformed during condensation. This means water can efficiently transfer heat with only a small difference in temperature between its liquid and gaseous phases. The partial vacuum, by lowering the boiling point, lowers the temperature at which this property of water can be exploited to efficiently cool the CPU or other component. Water cannot be used in conventional refrigeration equipment, because it would corrode the moving parts in compressors and expansion devices that are not used in the present invention. Alternatively, other fluids having high heats of vaporization and condensation (whether caused by hydrogen bonds or other factors) may by used in place of water in the present invention.

Figure 2:
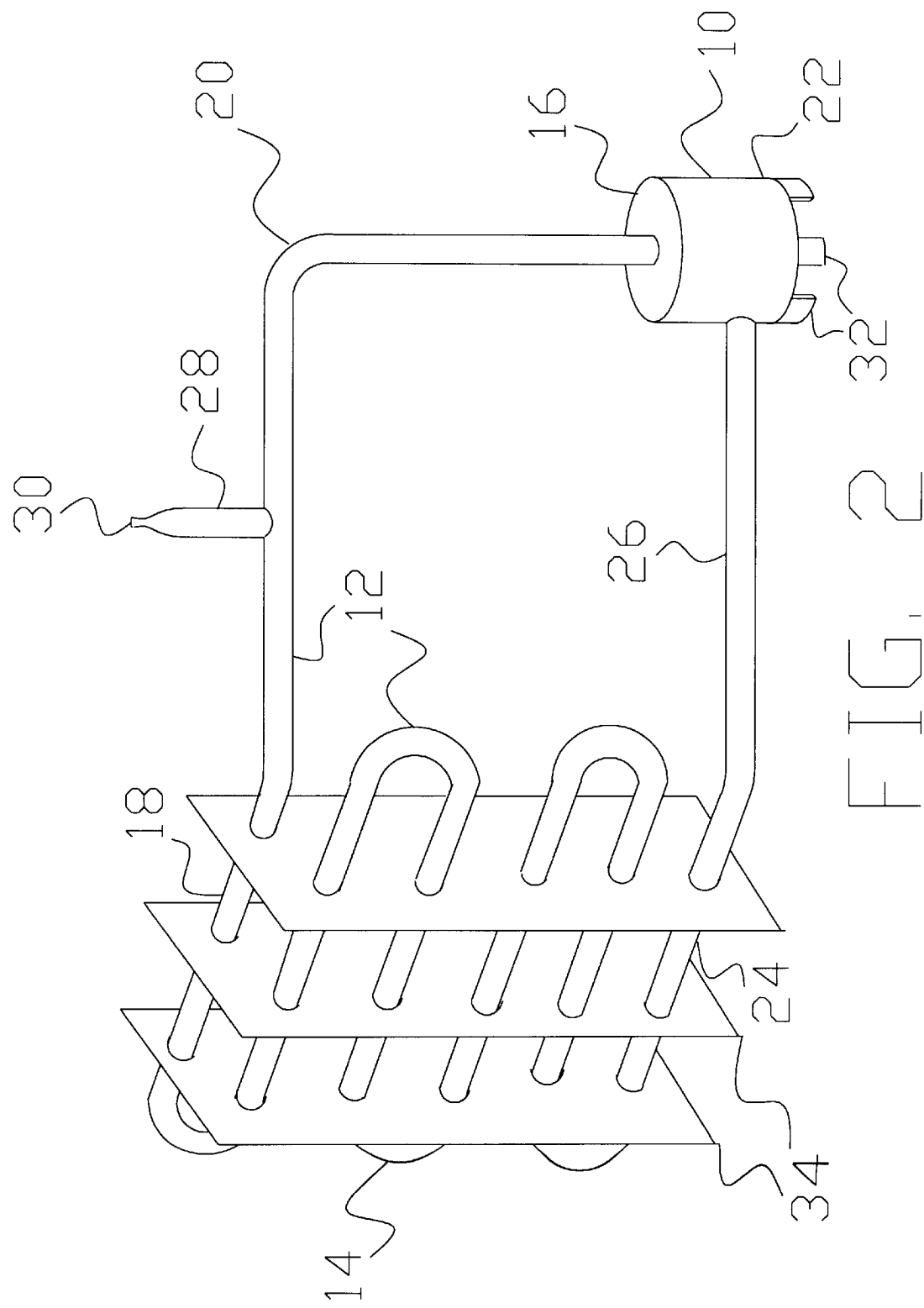
FIG. 2 is a perspective view of the invention, with optional radiation fins.

FIG. 2 is a perspective view of the invention, with optional radiation fins 34 attached to the condensation coils. The fins conduct heat from the condensation coils, thus increasing the rate at which heat is transferred by radiation to the surrounding air.

Figure 3:
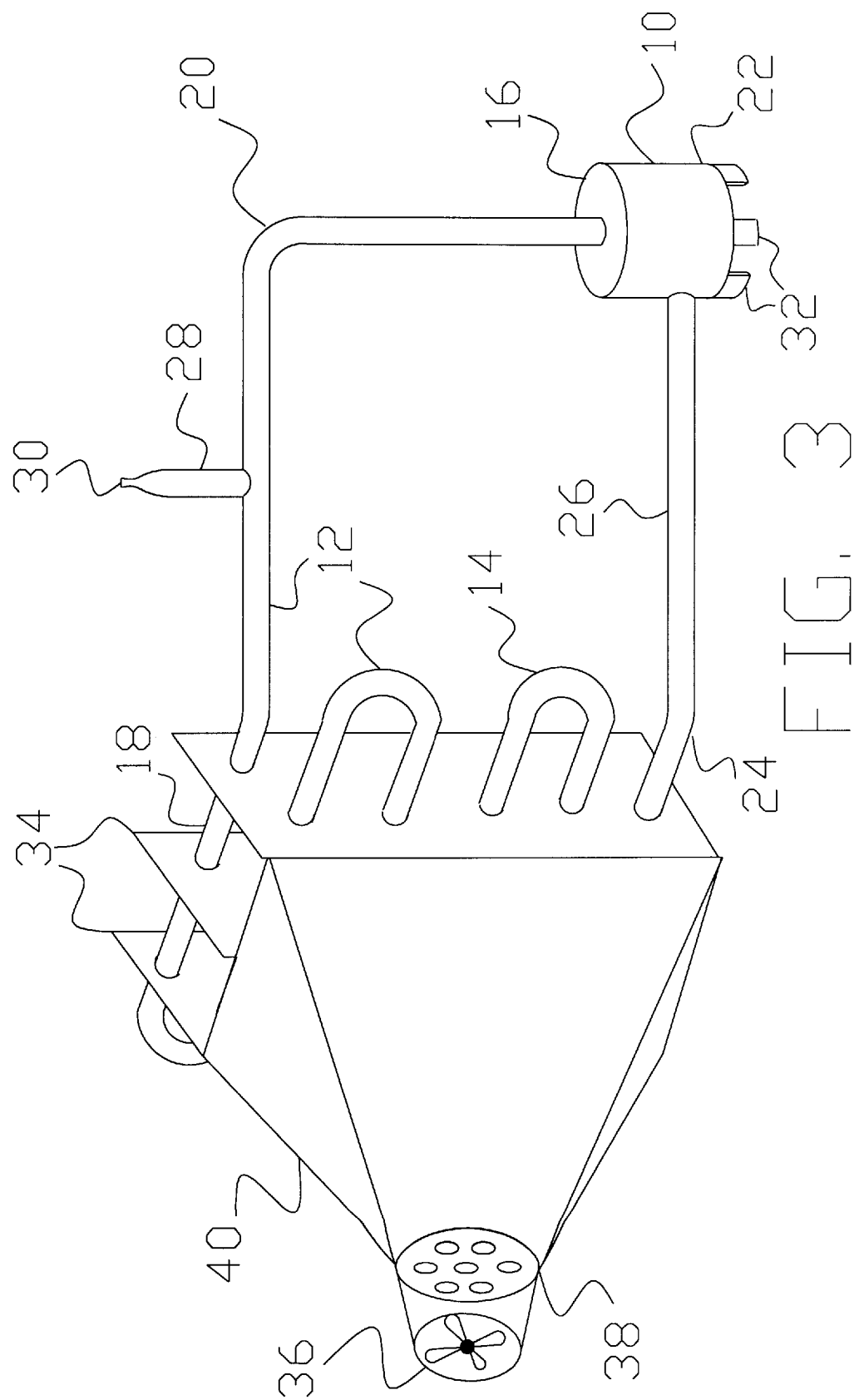
FIG. 3 is a perspective view of the invention, with optional radiation fins and an optional fan and baffle.

FIG. 3 is a perspective view of the invention, with optional radiation fins and an optional fan 36 and baffle 38, that are attached to a funnel 40. The fan blows surrounding air through the baffle and funnel over the condensation coils and radiation fins, thus increasing the rate at which heat is transferred by convection to the surrounding air. The baffle increases the pressure of the air being blow in by the fan on the exterior side of the baffle, and therefore the speed at which air passes through holes in the baffle to the interior side of the baffle, thus increasing the efficiency of heat loss by convection. (Alternatively, the fan may blow air outward, away from the condensation coils, in which case the baffle is not needed.) Note that the fan, although a moving part, is exterior to the conduit, and thus cannot be corroded by water in the conduit.

Figure 4:
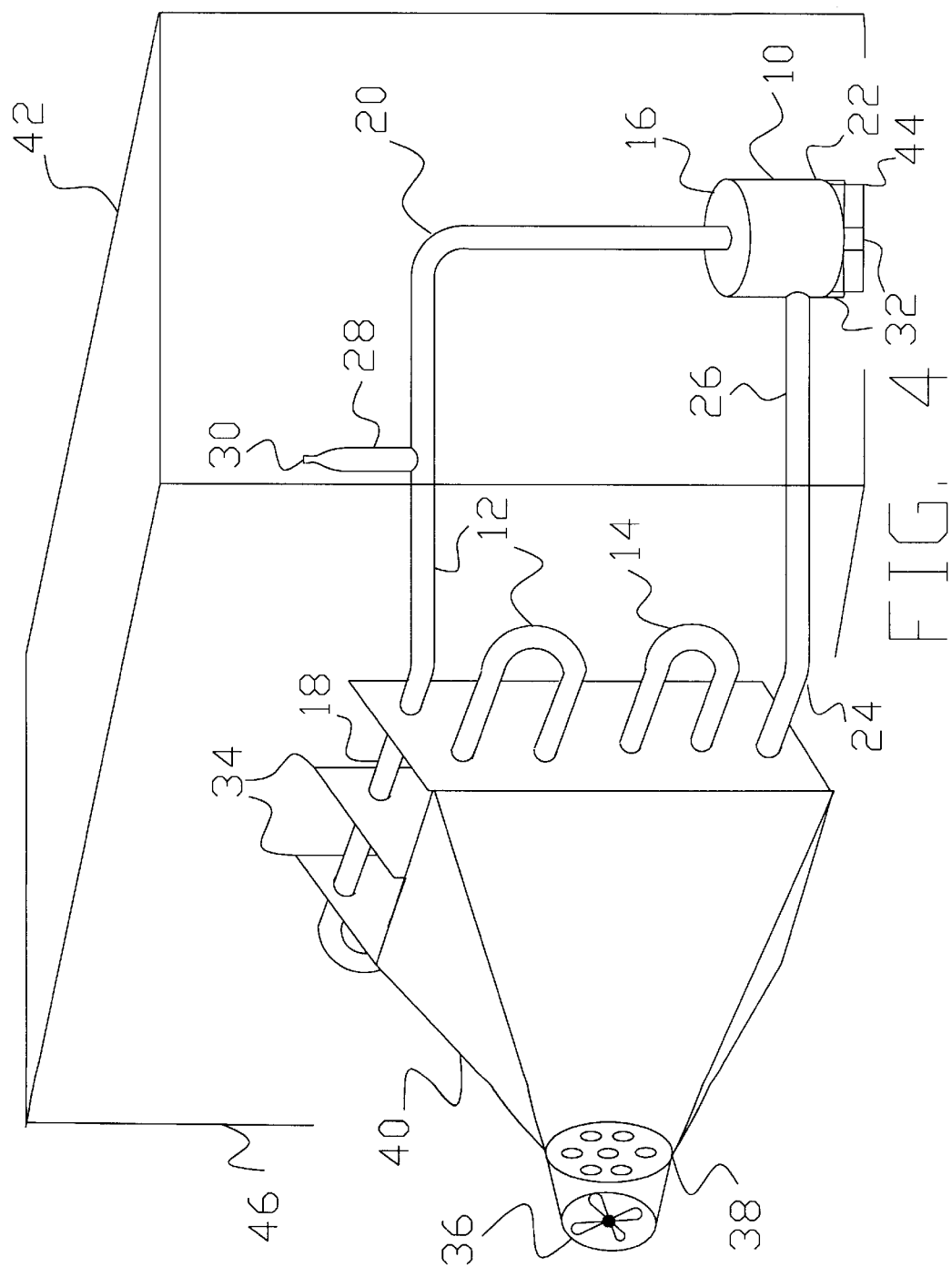
FIG. 4 is an environmental view of the invention, showing its use in a desktop computer.

FIG. 4 is an environmental view of the invention, showing its use in a desktop computer 42. The evaporation chamber 10 is placed over the CPU 44 to directly absorb heat from it. The condensation coil 14 is shown outside the computer's housing 46, but it may be located either inside or outside the housing, so long as it is positioned so as to be able to transfer heat to the surrounding air. The invention may be installed in the computer or other machine during manufacture, or it may be sold separately and installed later by the user.

It is to be understood that the present invention is not limited to the sole embodiment described above, but encompasses any and all embodiments within the scope of the following claims.

I claim:

1. A cooling system for a heat producing device, comprising:

a boiling chamber having a bottom end in thermal contact with a heat producing device;

a pipe with a first end, a second end, a middle portion, a first elongated portion between the first end and the middle portion, and a second elongated portion between the middle portion and the second end, with the first elongated portion elevated above the second elongated portion, the first end of the pipe joined to a top opening of the boiling chamber, and the second end of the pipe joined to a bottom opening of the boiling chamber, to form a hermetically sealed closed loop;

water under a partial vacuum in the closed loop, with the water being in a liquid state in a lower portion of the boiling chamber, where it absorbs heat and boils, with water vapor produced by boiling collecting in an upper portion of the boiling chamber, the water vapor then passing through the top opening of the boiling chamber into the first end of the pipe, and from the first end of the pipe to a middle portion of the pipe from which heat is dissipated, with the water vapor condensing back to liquid water in the middle portion, and the liquid water flowing by force of gravity from the middle portion to the second end of the pipe and through the bottom opening of the boiling chamber back into the lower portion of the boiling chamber.

2. A cooling system for a heat producing device according to claim 1, wherein the boiling chamber and the pipe have rigid metal walls surrounding an interior containing the water.

3. A cooling system for a heat producing device according to claim 2, wherein the pipe has a circular cross-section, with uniform interior and exterior diameters throughout its entire length.

4. A cooling system for a heat producing device according to claim 3, wherein the middle portion of the pipe is coiled.

5. A cooling system for a heat producing device according to claim 4, wherein there is an inlet in the pipe, through which water is poured in and air pumped out.

6. A cooling system for a heat producing device according to claim 5, wherein the inlet has an end that is crimped and soldered shut.

7. A cooling system for a heat producing device according to claim 6, wherein the boiling chamber and pipe are made of copper.

8. A cooling system for a heat producing device according to claim 7, wherein the boiling chamber is cylindrical.

9. A cooling system for a heat producing device according to claim 8, wherein the boiling chamber has prongs extending from its bottom end, by which it is retained on the heat producing device.

10. A cooling system for a heat producing device according to claim 9, wherein radiation fins are attached to the middle portion of the pipe.

11. A cooling system for a heat producing device according to claim 10, wherein a fan blows air through a baffle and funnel over the middle portion of the pipe and the radiation fins.

12. A cooling system for a heat producing device according to claim 11, wherein the heat producing device is an electronic device.

13. A cooling system for a heat producing device according to claim 12, wherein the heat producing device is a central processing unit of a computer.

14. A cooling system for a heat producing device according to claim 13, wherein the computer is a desktop computer.

* * * * *